United States Patent [19]
Brown

[11] 3,749,379
[45] July 31, 1973

[54] SYSTEM FOR THERMAL EXHAUST
[75] Inventor: Dale H. Brown, Scotia, N.Y.
[73] Assignee: General Electric Company, Schenectady, N.Y.
[22] Filed: Apr. 7, 1971
[21] Appl. No.: 131,980

[52] U.S. Cl. .................. 261/79 A, 261/DIG. 11
[51] Int. Cl. .............................................. B01f 3/04
[58] Field of Search ................. 261/DIG. 11, 79 A

[56] References Cited
UNITED STATES PATENTS

| | | | |
|---|---|---|---|
| 1,739,867 | 12/1929 | Seymour | 261/79 A |
| 2,732,190 | 1/1956 | Mart | 261/DIG. 11 |
| 3,243,166 | 3/1966 | Osenga et al. | 261/DIG. 11 |
| 3,400,917 | 9/1968 | Richards | 261/DIG. 11 |
| 3,608,873 | 9/1971 | Furlong | 261/DIG. 11 |

FOREIGN PATENTS OR APPLICATIONS

| | | | |
|---|---|---|---|
| 521,128 | 3/1931 | Germany | 261/DIG. 11 |
| 679,627 | 9/1952 | Great Britain | 261/DIG. 11 |
| 933,222 | 8/1963 | Great Britain | 261/DIG. 11 |

Primary Examiner—Tim R. Miles
Assistant Examiner—Steven H. Markowitz
Attorney—Paul A. Frank, John F. Ahern, Julius J. Zaskalicky, Frank L. Neuhauser, Oscar B. Waddell and Joseph B. Forman

[57] ABSTRACT

In the rise of plumes of hot gases into the atmosphere from the exhaust port of a cooling tower, it has been found that a substantial increase in the cross-sectional area of the exhaust port produces a substantial increase in the height of the plume. For a given rate of thermal exhaust enlargement of the cross-sectional area is accompanied by reduction in the velocity of flow of gases from the exhaust port.

2 Claims, 4 Drawing Figures

PATENTED JUL 31 1973

INVENTOR
DALE H. BROWN
BY Julius J. Zaskalicky
HIS ATTORNEY

SYSTEM FOR THERMAL EXHAUST

The present invention relates to gaseous exhaust systems for continuously discharging hot gases into the atmosphere surrounding the earth and in particular to means for augmenting the height to which the plumes of gas from such discharges rise.

One type of such exhaust system is a cooling tower which is used in connection with the steam turbines of electric power plants for cooling the steam directly by heat exchange action or indirectly by cooling the water used for cooling the steam in the heat exchangers of the system. Two types of such cooling towers are commonly used, one known as the dry tower and the other known as the wet tower. In the dry cooling tower the cooling water flows in a closed and conservative cycle. In the wet cooling tower the warm water from the heat condenser is cooled by evaporative action as well as convective action of the air circulated through the tower. In cooling towers of the wet variety, there is provided a plurality of packing or heat exchange elements on which the water to be cooled is sprayed, dripped, or flowed and through which the cooling air is passed from an inlet port to an outlet port. The cooling air is heated and becomes saturated with water as it passes through the packing. The temperature of the air leaving the tower is higher than the temperature of the surrounding air and accordingly it rises. As the plume rises it causes ambient air to flow towards it and become entrained with it thereby increasing its mass and volume as it moves upward.

As the heated air moves upward it moves outward as well to form a plume of diameter increasing with height. At some height the upward propelling buoyancy forces of the atmosphere on the plume at that height is zero, i.e., the atmospheric air displacement is equal in weight to the weight of the gases of the plume. Such height is referred to as the minimum of zero buoyancy height of the plume. However, as the gases in the plume have a certain velocity or momentum at that height they continue to rise until the momentum is dissipated. The height at which the momentum of the plume gases is zero is referred to as the maximum or momentum height of the plume. Between the miminum and maximum height planes of the plume the gases thereof spread out in the horizontal direction and become dissipated and diffused into the surrounding atmosphere.

It is highly desirable to dissipate the exhaust gas and in particular the heat associated therewith in locations remote from the location of the cooling tower. In the vicinity of metropolitan areas where temperature inversion layers occur in which cold air is entrapped by a layer of warm air which may occur anywhere in the range of 500–1000 feet above ground, it is important for the thermal and other exhaust gases from stacks in the area to be dissipated above or through the termal inversion layer, otherwise the discharge is contained within the entrapped colder air and contaminates it. To achieve such an objective, natural draft towers of considerable height have been utilized. Such towers have been made high to assure that the exhaust therefrom rises to a sufficient height so that air flows at such height move and dissipate the exhaust gases at points remote from the location of the tower. The basic objection to natural draft cooling towers which typically are 300–450 feet high is that they dominate the visual landscape. Also towers of such height are difficult to design to withstand high winds. In some cases, forced draft towers using high velocity exhaust without substantial height have been utilized to raise the height of the plume. In such cases without a high rise chimney, the heated plumes rise only short distances and exhaust discharges occur in the form of fog in the vicinity thereof. Towers of the natural draft and forced draft variety are described in an article on page 19 of the Mar. 25, 1968 issue of ELECTRICAL WORLD by William C. Davidson, entitled "Tower's Cooling Doubled by Fan-Assisted Draft".

Accordingly, an object of the present invention is to provide an improvement in cooling towers of the natural draft and forced draft variety.

Another object of the present invention is to provide means for substantially augmenting the height to which plumes of exhaust gas from vertically oriented exhaust ports extend without the need for utilizing towers of substantial height.

Another object of the present invention is to provide improved means for disposal into the atmosphere of thermal exhaust from power stations.

Another object of the present invention is to provide a low profile exhaust gas structure for hot gaseous exhaust.

A further object of the present invention is to provide means for ventilating the air over areas in which cold air is entrapped by a layer of warmer air.

The features of my invention which I desire to protect are pointed out with particularity in the appended claims. The invention itself, however, both as to its organization and method of operation together with further objects and advantages thereof may best be understood by reference to the following description taken in connection with the accompanying drawings wherein:

Figure 3:
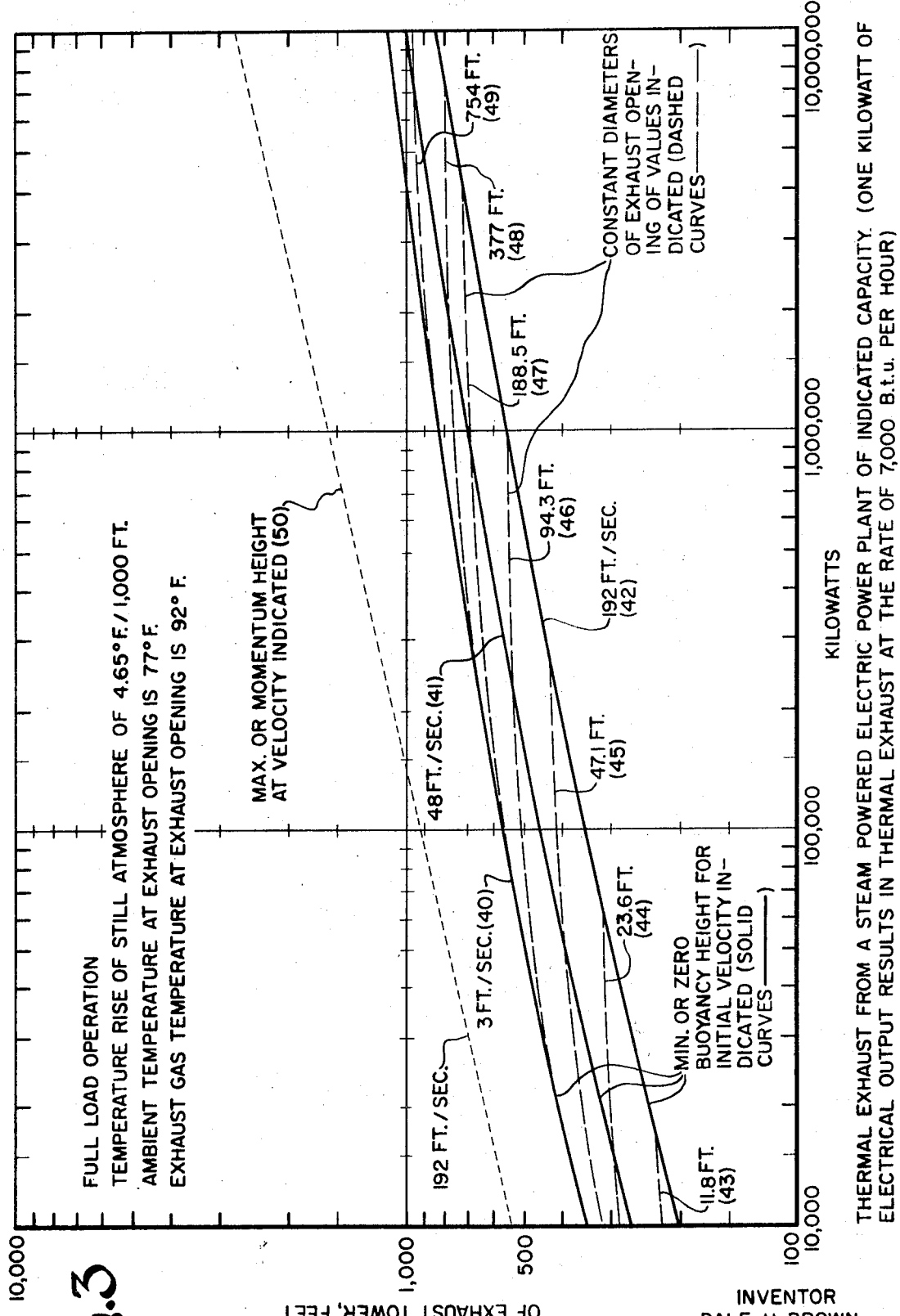

FIG. 3 shows a series of graphs of the manner in which minimum or zero buoyancy height of a plume varies with thermal exhaust from power plants of increasing power generating capacity for various constant values of velocity of gaseous exhaust from the exhaust opening thereof and also shows another series of graphs of the manner in which the minimum or buoyancy height of a plume varies with thermal exhaust from power plants of increasing power generating capacity for various constant values of the diameter of the exhaust openings thereof.

Figure 4:
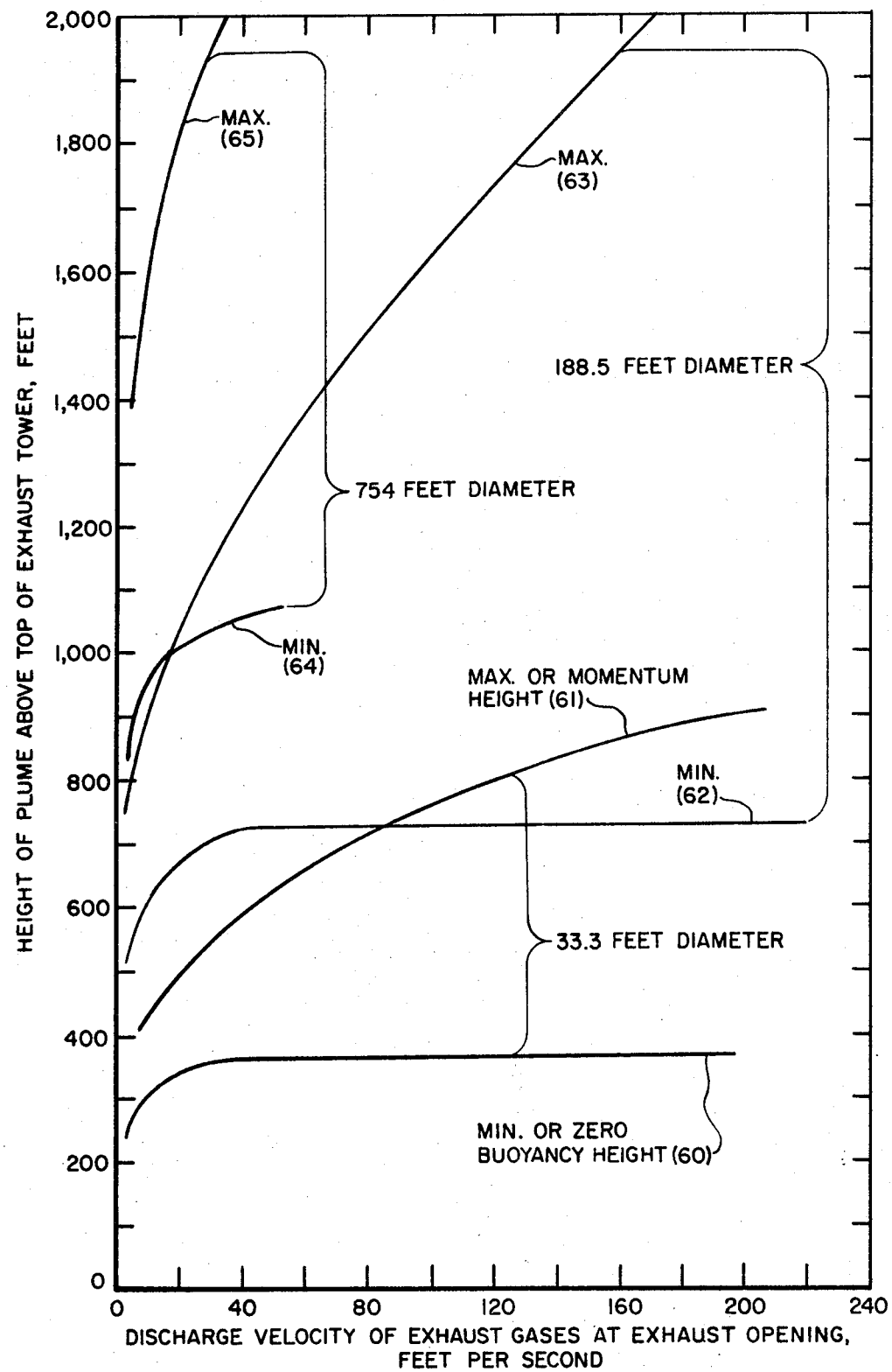

FIG. 4 shows three pairs of graphs, each pair for a respective particular diameter of exhaust opening, of the manner in which the minimum or buoyancy height of a plume and the maximum or momentum height of a plume varies with increasing velocity of exhaust.

Figure 1:
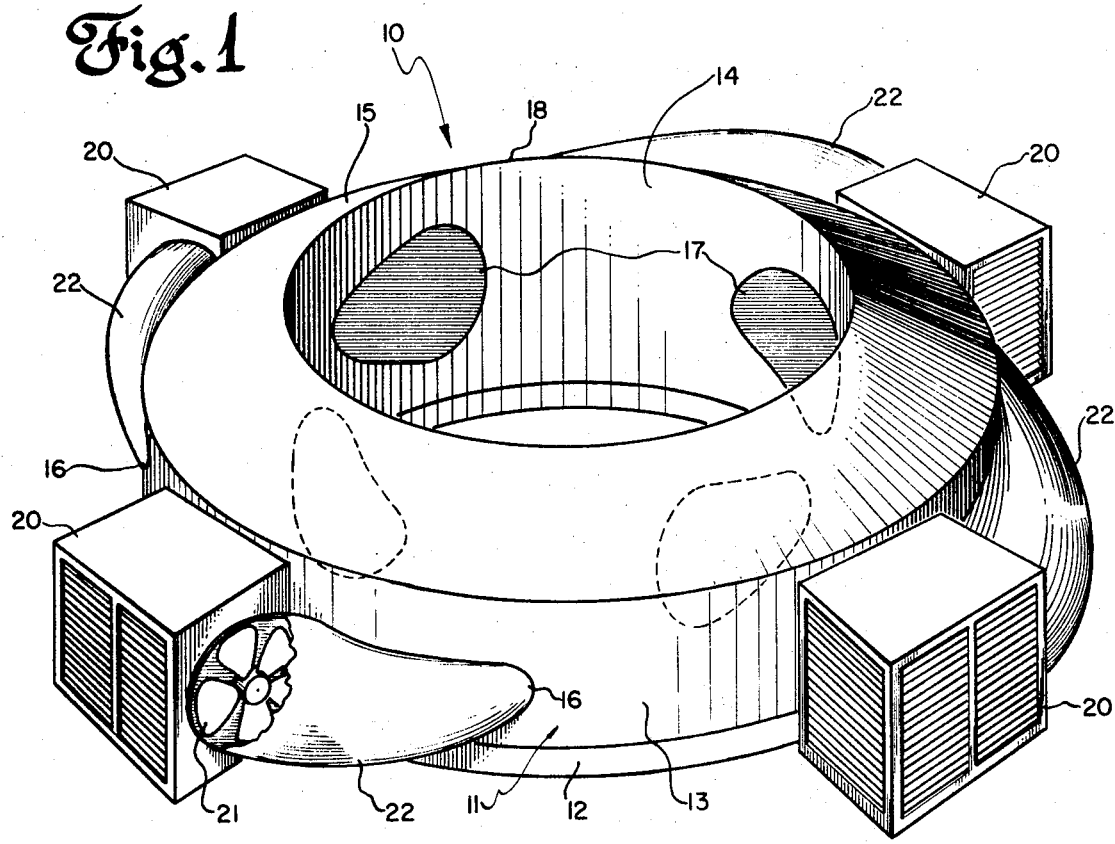
FIG. 1 shows a perspective view of a low profile-high plume rise cooling tower system in accordance with the present invention.

Reference is now made to FIG. 1 which shows a perspective view of a cooling tower assembly 10 for cooling the cooling water used in steam condensation in electric power plants in accordance with the present invention. In this assembly there is shown a toroidal shaped housing member 11 including a base member 12, an outer wall member 13, an inner wall member 14 and an upper wall member 15. The outer wall member 13 is a section of a cylinder having a plurality of inlet openings 16 located about the circumference thereof. The inner wall member is also cylindrical in form and also has a plurality of outlet openings 17 therein. The upper wall member 15 which may be aerodynamically shaped to minimize wind resistance closes the space between the base, inner and outer wall members to form a toroidal shaped chamber or plenum. Adjacent each of the openings 16 is provided a respective wet cooling tower 20 into which water from the cooling system of the electric power generator plant is applied and through which air flows by action of a fan 21 associated with the cooling tower for drawing air therethrough. A plurality of ducts 22 are provided, each duct connecting the outlet of a respective wet cooling tower 20 to a respective inlet opening 16. Each of the wet cooling towers 20 are conventional units and may be units such as manufactured by The Marley Company of Kansas City, Missouri and called "Water Cooling Towers." Such towers are well known in the art for the purpose of cooling the water utilized in the steam condenser systems of electric generating plants by heat exchange action with air flowing through the tower. The air from each of the cooling towers is warmed and is at a temperature above the temperature of the surrounding atmosphere. The air from the towers is mixed in the plenum or toroidal chamber of housing member 11 to provide air of relatively uniform temperature and thereupon passes through the openings 17 in the inner wall member into the central stack or chimney formed by the inner wall member 14 and out the exhaust opening or port 18 thereof.

Figure 2:
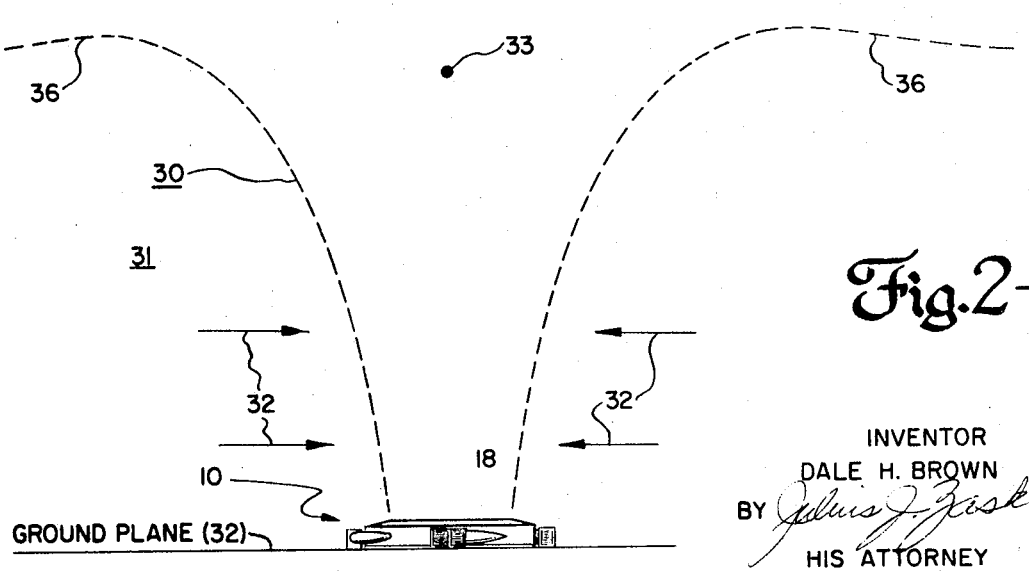
FIG. 2 shows a diagrammatic representation in cross section of a plume of hot exhaust gases emanating from a vertically oriented opening, such as in the cooling tower assembly of FIG. 1, into the colder atmosphere surrounding the earth.

Reference is now made to FIG. 2 which shows the manner in which a plume 30 or column of hot air rises into the colder atmosphere 31 from the cooling tower assembly 10 of FIG. 1. In this figure the cooling tower assembly 10 has a low profile, its overall height above a ground plane 32 is small, for example, less than 100 feet and the diameter of the exhaust opening 18 is relatively larger, for example, greater than 200 feet. Hot exhaust gases are continuously supplied to the exhaust opening 18. As the mass of exhaust gases displace ambient air which is heavier, the exhaust gases move upward into the atmosphere 31. The upward flow of exhaust gases causes an inward flow of cool ambient air, as indicated by arrows 32, which mixes with the rising exhaust gases and decreases its rate of rise. The exhaust gases rise to a height indicated by the point 33 where the diluted rising exhaust gases have displaced atmospheric air which equals the weight of the exhaust gases and which is referred to as the minimum height or zero buoyancy height of the plume 30. However, in reaching the height of point 33, the diluted exhaust gases have a certain momentum which carries them beyond the height represented by the point 33 to a height represented by the point 34 where the momentum of the exhaust gases is zero. The height represented by the point 34 is referred to as the maximum or momentum height of the plume 30. Between the zero buoyancy height and momentum height of the plume the gases thereof spread out in a horizontal direction and become dissipated and diffused into the surrounding atmosphere as shown by the horizontally extending upper line 35 and lower line 36.

The differential equations governing the behavior of hot gases issuing from a source into a colder atmosphere are set forth in an article entitled "Turbulent Gravitational Convection from Maintained and Instantaneous Sources" by R.B. Morton, Sir Geoffrey Taylor, and J.S. Turner in Proceedings of Royal Society London, Ser. A, V234, pages 1–23 (1956). In that article the three differential equations governing plume rise appear as equations of set 8 on page 7 and are the following:

$$dW/dx = 2 \alpha V .$$

1

$$dV^4/dx = 4 FW .$$

2

$$dF/dx = - 2WG .$$

3

In these equations the nomenclature is as follows:
- $x$ is the height above the opening from which the gases issue.
- $\alpha$ is the entrainment constant and represents the ratio of the velocity of ambient air into the plume to the upward velocity of the plume. The article assumes that the ratio is relatively constant and I have found it to be relatively constant at a value of about 0.1.
- $W$ is proportional to the mass flow passing a horizontal plane of the plume.
- $V^2$ is proportional to the momentum flow passing a horizontal plane of the plume.
- $F$ is proportional to the buoyancy flow passing a horizontal plane of the plume.
- $G$ is a function of the density gradient of the atmosphere.

In the article the above equations are evaluated for the boundary conditions at the source of the plume of $V = 0$, and $W = 0$, i.e., for a point source and an initial velocity of zero. (See equations of set 9 on page 7 of the article) The authors assume that the height to which the plume rises is independent of the diameter of the base of the plume, i.e., at the exhaust opening, and that the gases from the opening have zero initial velocity. Note that in equations (10) that height $x$ derived by dimensional analysis is not expressed as a function of diameter of the exhaust opening or initial velocity of the gases from the exhaust opening. Note also that the height of plume H in equation (25) of the article on page 20 is expressed in terms of the temperature gradient of the atmosphere and the heat input to the exhaust gases of the plume.

I have found that the zero buoyancy height to which a plume rises increases with increasing diameter of the base of the plume or the size of the opening from which the plume issues in the case where the plumes have generally circular bases. The physical basis for this discovery can be appreciated from the following observations. As ambient gases mix with the plume along the periphery thereof, for a given cross-sectional area of the plume, the least mixing of ambient gases occurs when the ratio of cross-sectional area to a circumferential length is maximum such as in the case of circles or figure generally of circular form. Also as the area of a circle increases at a faster rate than its circumference, less ambient mixing would occur in plumes of larger cross-sectional area. Accordingly, the energy of large generally circular cross-sectional plumes is retained for a longer period of time than plumes of small cross-sectional area and hence would rise higher.

Using the equations referred to above and denoted in this specification as equations 1, 2 and 3, I have calculated the zero buoyancy height to which a circular plume of hot air continuously emitted from an opening of circular cross section and exhausting thermal energy at a specified rate for various rates of thermal exhaust. In FIG. 3, to which reference is now made, three graphs 40, 41 and 42, each for a different initial velocity of exhaust are shown in which the ordinate represents the height and the abscissa represents the rate of thermal exhaust from power plants of the capacities indicated. The conversion factor used is 7000 b.t.u. per hour per kilowatt of electrical capacity. The temperature rise in still atmosphere is assumed to be 4.65° Farenheit per thousand feet of elevation. The ambient temperature at the exhaust opening is assumed to be 77°F. The exhaust gas temperature at the exhaust opening is assumed to be 92°F. Graph 40 represents the buoyancy or minimum height of the plume at an initial exhaust velocity from the opening of 3 feet per second. Graph 41 represents the buoyancy height of the plume of an initial exhaust velocity of 48 feet per second. Graph 42 represents the zero buoyancy height of the plume at an initial exhaust velocity of 192 feet per second. Also shown in dotted lines in FIG. 3 are graphs of circular exhaust openings of various diameters. Graphs 43, 44, 45, 46, 47, 48 and 49 represent exhaust openings of diameters in feet respectively, of 11.8, 23.6, 47.1, 94.3, 188.5, 377 and 754. The meaning of the data on the graphs will be appreciated from a specific example. For a power plant of 100,000 kilowatt capacity as the diameter of the exhaust opening is increased from about 30 feet to 188.5 feet and the exhaust velocity decreased from 192 feet/second to 3 feet per second to maintain constant thermal exhaust, the zero buoyancy height is increased from 350 feet to 560 feet.

It will be understood that if the thermal energy content per unit volume of exhaust is increased, the height represented by the graphs mentioned above would be shifted upward, i.e., because of the greater energy content of the exhaust the zero buoyancy heights would be greater. Also if a smaller atmospheric temperature rise than 4.65 per thousand feet of elevation is assumed the zero buoyancy heights for all of the graphs would also be greater.

It was mentioned above that at the zero buoyancy height the gases in the plume have a certain momentum which carries the gases to a height referred to as the maximum or momentum height. In FIG. 3 the graph 50 represents the maximum height of the plume for the condition of initial velocity at exhaust opening of 192 feet per second.

Reference is now made to FIG. 4 which shows three pairs of graphs, each pair including a graph of minimum or zero buoyancy height and a graph of maximum or momentum height for an exhaust opening of a particular diameter as a function of discharge velocity of exhaust. Graphs 60 and 61 correspond to an exhaust opening of 33.3 feet diameter. Graphs 62 and 63 correspond to an exhaust opening of 188.5 feet. Graphs 64 and 65 correspond to an exhaust of 754 feet. From these graphs it is apparent that the minimum height of plume begins to level off at about exhaust velocities of 25 feet per second and any increase in exhaust velocity beyond about 40 feet per second, the minimum height of the plume, is not appreciably increased. However, the maximum or momentum height is a strong function of the discharge velocity from the exhaust opening or source of the plume.

In cooling tower assemblies as well as in other assemblies such as smoke stacks from which hot gases are exhausted into the atmosphere, it is important to elevate the exhaust gases to a sufficient height where the atmospheric currents dilute and disperse them to regions remote from the source. Accordingly, the minimum or buoyancy height of the plume is an important height which indicates that exhaust gases will rise at least to that height and from my observations and calculations will rise some distance beyond that point due to the fact that the exahust gases of the plume have some momentum at that height. Between the minimum and maximum height points the gases spread outward. In accordance with one aspect of the present invention greater minimum heights are attained by increasing the diameter of the exhaust opening. Concurrently for a constant rate of thermal exhaust the velocity thereof may be reduced. In accordance with another aspect of the present invention, exhaust towers or chimneys are provided which have large diameters and small elevations to achieve elevation of thermal exhaust to heights in the atmosphere that heretofore could be achieved only by tall chimneys. Diameters greater than 200 feet and elevations less than 100 feet are preferred. The velocity of exhaust to achieve the best minimum height attainable need not be greater than about 25 feet per second.

In accordance with a further aspect of the present invention, the high rise plume established by a large diameter exhaust opening and perhaps aided by an initial velocity to establish a high maximum height of plume would be provided to penetrate the inversion layer which exists at a particular height, for example, at 1000 feet and which may have a depth of several hundred feet. Such assemblies would funnel not only the thermal exhaust from the power generating plant but would also suck in the part of the atmosphere below the inversion layer and vent it above the inversion layer.

While the invention has been described in connection with cooling tower assemblies, it is apparent that it is applicable to other exhaust gas systems as well. While the invention has been illustrated by examples which assume a still atmosphere free of winds, winds of low velocity would not affect the validity of the results obtained.

While the invention has been described in specific embodiments, it will be appreciated that modifications may be made by those skilled in the art and I intend by the appended claims to cover all such modifications and changes as fall within the true spirit and scope of the invention.

What I claim as new and desire to secure by Letters Patent of the United States is:

1. In combination, inner and outer vertically-disposed concentrically-arranged circular wall members defining a plenum space therebetween, said inner wall member encompassing a vertically-disposed cylindrical central opening terminating at the top of said inner wall member in a circular discharge opening, said circular discharge opening having a diameter which is at least twice the height of said cylindrical central opening, said inner circular wall member having a plurality of circumferentially spaced inlet openings therethrough, each providing communication between said plenum space and said cylindrical central opening, said outer circular wall member having a plurality of circumferentially spaced inlet openings therethrough, a horizontally-disposed base member located below said vertically-disposed inner and outer wall members for supporting said inner and outer wall members and forming a closure at the bottom of said plenum space and at the bottom of said cylindrical central opening, an annular upper wall member atop said inner and outer wall members forming a closure at the top of said plenum space, a plurality of cooling towers circumferentially spaced around the outer periphery of said outer wall member, each said cooling tower including an ambient air inlet port and a hot air exhaust port, a plurality of ducts, each duct coupling a different one of said exhaust ports with a different one of said inlet openings in said outer wall member, and fan means in each duct operable for drawing ambient air into each cooling tower through said inlet port thereof for heat exchange in said cooling tower and subsequent exhaust as hot air through said exhaust port of said cooling tower and through said duct into said plenum space wherein the hot air from all the ducts is mixed so as to attain a relatively uniform temperature before passing into said vertical cylindrical central opening and discharging therefrom at said circular discharge opening at a discharge velocity in the range between 25 and 40 feet per second.

2. The combination defined by claim 11 wherein the diameter of said circular discharge opening is at least 200 feet and the height of said vertically-disposed cylindrical central opening is not greater than 100 feet.

* * * * *